J. G. McDOWELL.
OSCILLATING MOTOR.
APPLICATION FILED AUG. 12, 1907.

1,006,966.

Patented Oct. 24, 1911.

2 SHEETS—SHEET 1.

WITNESSES
Walter Samariss
G. B. Bleming

INVENTOR
J. G. McDowell,
by Bakewell, Byrnes & Parmelee,
his Attys.

J. G. McDOWELL.
OSCILLATING MOTOR.
APPLICATION FILED AUG. 12, 1907.
1,006,966.
Patented Oct. 24, 1911.
2 SHEETS—SHEET 2.
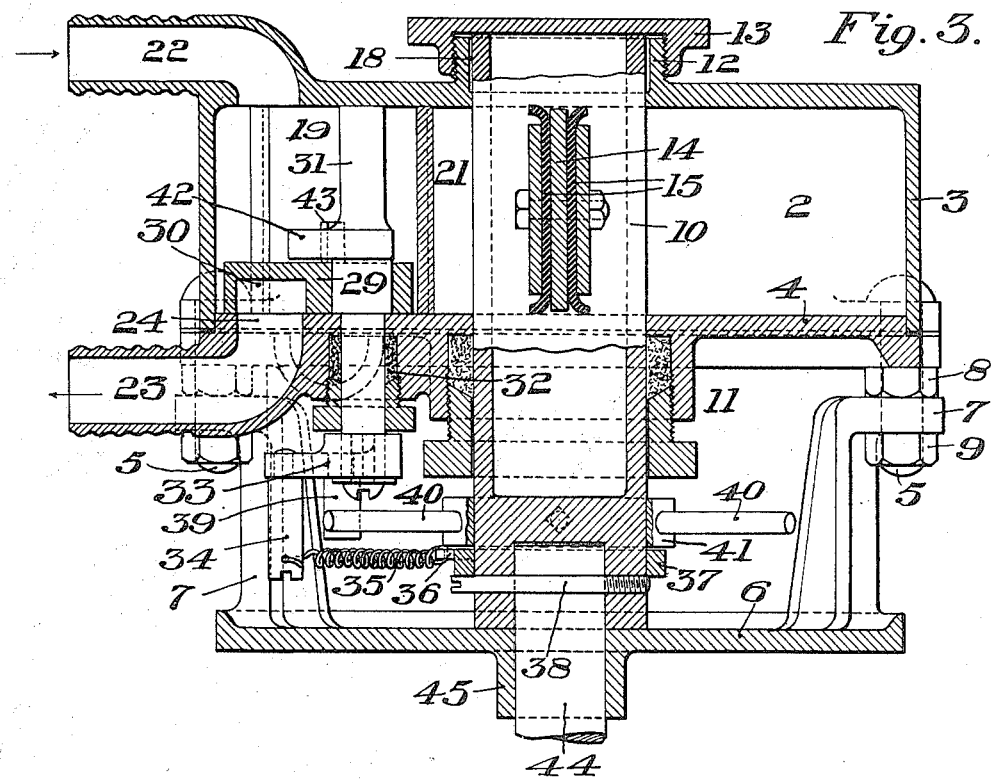
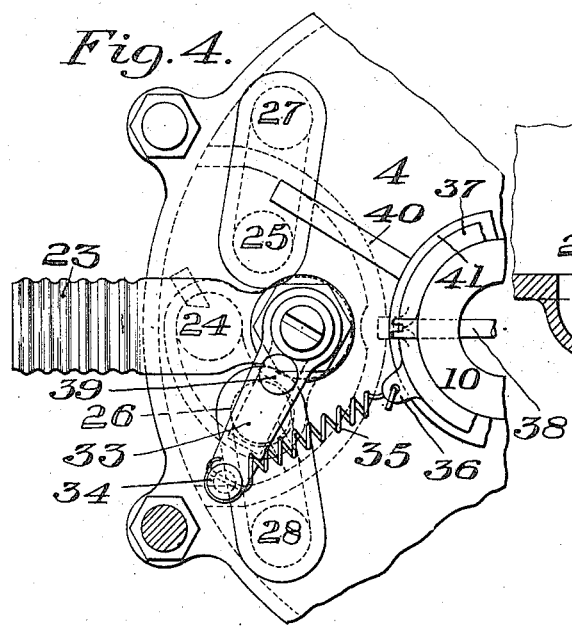
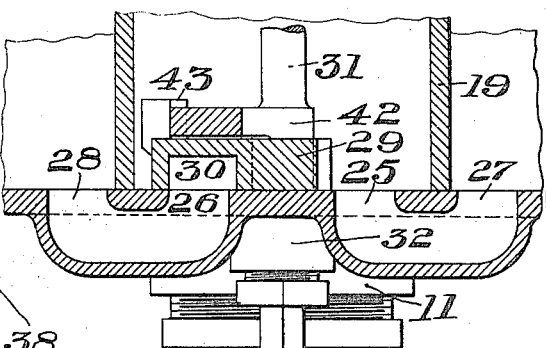
WITNESSES
INVENTOR
J. G. McDowell,
by Bakewell, Byrnes & Parmelee.
his Attys.

UNITED STATES PATENT OFFICE.

JOHN G. McDOWELL, OF PITTSBURGH, PENNSYLVANIA.

OSCILLATING MOTOR.

1,006,966.    Specification of Letters Patent.    Patented Oct. 24, 1911.

Application filed August 12, 1907. Serial No. 388,142.

*To all whom it may concern:*

Be it known that I, JOHN G. McDOWELL, of Pittsburgh, Allegheny county, Pennsylvania, have invented a new and useful Improvement in Oscillating Motors, of which the following is a full, clear, and exact description, reference being had to the accompanying drawings, forming part of this specification, in which—

Figure 1:
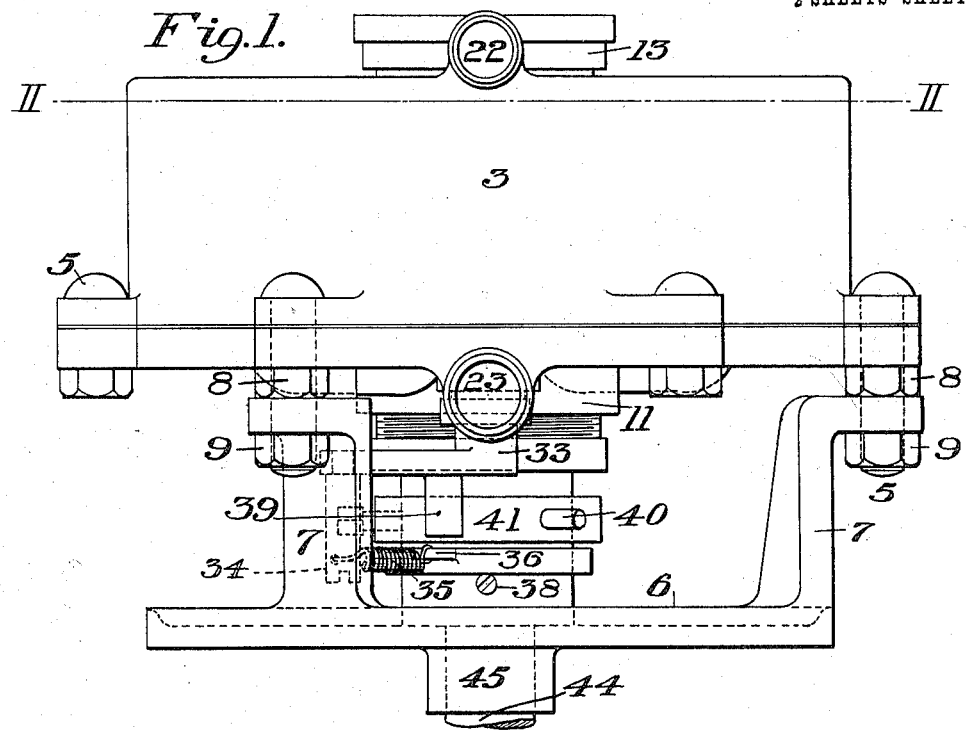
Figure 2:
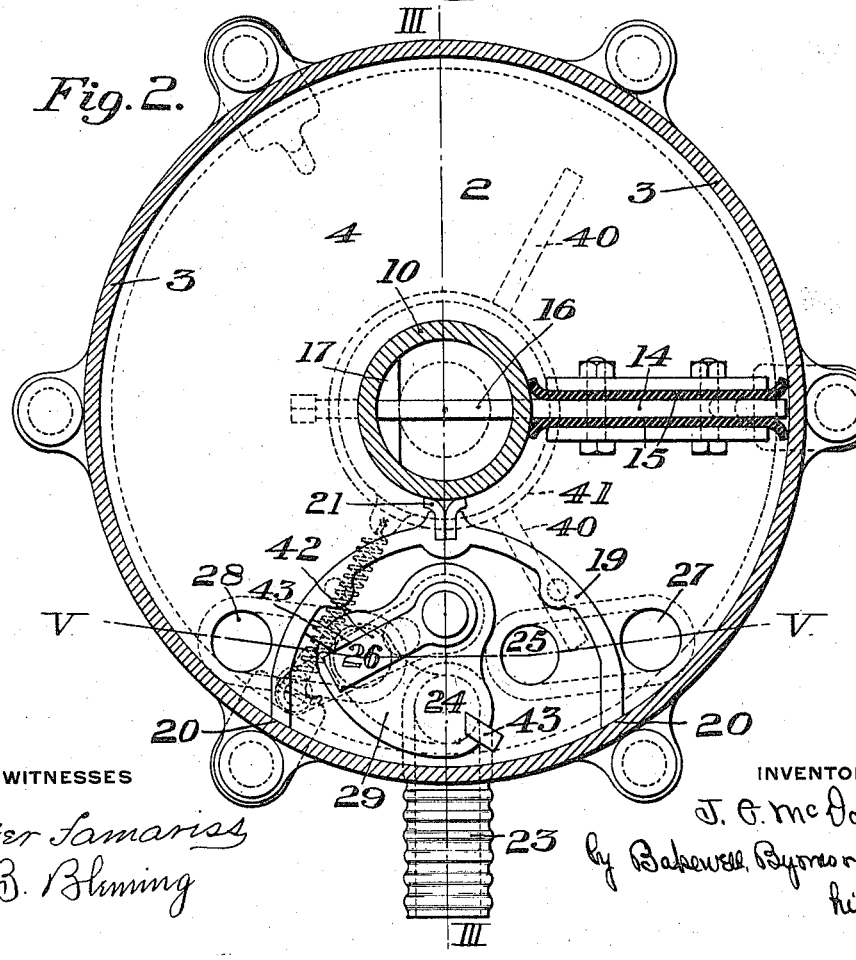

Figure 1 is a side elevation of one form of motor embodying my invention; Fig. 2 is a horizontal section of the same taken on the line II—II of Fig. 1; Fig. 3 is a vertical section on the line III—III of Fig. 2, made slightly irregular to show certain parts; Fig. 4 is a detail view of a portion of the motor showing the valve mechanism looking upwardly at the same from the bottom of the motor with the base removed; and Fig. 5 is a detail sectional view taken on the line V—V of Fig. 2.

My invention has relation to oscillating motors designed to be operated by water pressure, the object being to provide a simple and efficient form of motor which can be readily connected to a water service pipe and operated by a comparatively low pressure, and which is especially adapted for operating devices requiring an oscillating motion, such for instance as washing machines.

My invention will be best understood by reference to the accompanying drawings, in which I have shown one embodiment thereof, in the best form now known to me, it being premised, however, that various changes may be made therein by those skilled in the art without departing from my invention as defined in the appended claims.

In these drawings, the numeral 2 designates a motor chamber, which is formed by a sectional casing comprising an upper cylindrical portion 3 and a bottom plate or portion 4, which closes the open bottom of the portion 3, the parts being secured together by bolts 5. This casing is shown as supported by a base 6 having upwardly extending lugs 7, some of the bolts 5 being made long enough to also extend through these lugs, as shown in Fig. 3, 8 being the nuts which clamp the parts 3 and 4 together, and 9 the nuts on said bolts which secure the casing to the base lugs.

10 designates the motor shaft, which extends centrally through the chamber 2, a stuffing box 11 being provided where it extends through the bottom plate 4 of said chamber, its lower end resting on the base 6. The upper end of the shaft extends through a central opening in the top of the portion 3 of the casing, in which it has a neat fit, and into an upwardly extending boss 12 having a cap 13 adjustably threaded thereon and against the under side of which the top of the shaft has a bearing, said cap forming a means of adjustment for the shaft. Thus, it will be seen that by screwing down the cap against the end of the shaft, the latter may be kept properly down against its lower bearing so that jumping or wabbling of the shaft and blade in operation is prevented. Secured to said shaft in any suitable manner, is a radially extending piston blade 14 having cup-leathers 15 secured to each side thereof, the outer edge of the piston blade and of said leathers working in close contact with the inner wall of the motor chamber. This blade is shown as having a shank 16 which is extended into the hollow interior of the shaft into engagement with a slotted lug 17 in the opposite wall thereof whereby it is firmly secured. It may obviously, however, be secured in any suitable manner. The shaft is made hollow at its upper portion to form a lubricant chamber, a small lubricant space 18 being provided around its upper end within the base 12. It has been found in practice that as the motor operates there is a suction action of some kind sufficient to draw the lubricant from within the hollow interior of the shaft to at all times maintain the proper lubrication of the parts.

19 is a segmental wall, which is set within the chamber 2, as best shown in Fig. 2, to form a valve chamber, this segment inclosing a substantially semi-cylindrical space constituting such chamber. The segment extends the full height of the chamber, and is rigidly secured in any suitable manner, its edges 20 forming a close fit with the inner wall of the casing section 3. A packing strip 21 is seated in the central portion of this segment, and bears at its free edges against the periphery of the shaft 10 to cut off the passage of water from one side to the other.

22 designates an inlet or supply pipe, which leads from the upper portion of the motor casing directly over and into the valve chamber or compartment formed by the segment 19.

23 designates an outlet or exhaust pipe, which communicates with the central portion of said chamber through the port 24.

25 and 26 are two ports leading downwardly through the bottom wall of said chamber, one at each side of the port 24, and communicating respectively by suitable passages with the ports 27 and 28, which open upwardly into the motor chamber 2 at opposite sides of the segment 19. (See Figs. 2 and 5).

29 is a valve of general segmental form, having therein a chamber 30 closed except at the bottom, and of a sufficient length to connect either of the ports 25 and 26 with the port 24, ports 24 and 25 being connected by the valve in one of its positions, and ports 24 and 26 being connected thereby in its other position. This valve works in contact with the upper surface of the bottom wall of said compartment, formed by the plate 4, and is loosely sleeved on a stem 31, which extends through said wall and downwardly through a stuffing box 32, its lower end having a crank 33 which carries a pin 34, to which is attached one end of a spring 35. The other end of said spring is connected to a lug 36 on a collar 37, which is loosely sleeved on the lower portion of the motor shaft 10, and is supported thereon by the pin 38. The arm 33 also carries a depending lug or projection 39, which is designed to be engaged by either one of two radially projecting pins or arms 40, which are carried by a collar 41 secured to the shaft 10 above the collar 37. Above the valve 29 the stem 31 has secured thereto a radially projecting arm 42, which has a free movement between two lugs 43 which project upwardly at opposite sides of the valve 29, and which also constitute stops for limiting the movement of said valve by their engagement with the inner wall of the segment 19.

The piston blade 14 is designed to have an oscillating movement through less than 360 degrees, one limit of its movement being near one side of the segment 19, and its other limit of movement being near the opposite side of said segment.

The operation is as follows:—The water enters through the pipe 22 into the valve chamber or compartment. In the position of the valve shown in Fig. 2, the port 25 is open and the water passes downwardly through the port 25 and upwardly into the motor chamber behind the blade 14 through the port 27 and exerts an actuating pressure against the blade. As the blade moves under this pressure, the water at the opposite side exhausts through the ports 28 and 26 into the chamber 30, and from the chamber 30 to the outlet pipe 23 through the port 24. As the blade approaches the limit of its movement in this direction, one of the pins or arms 40 contacts with the downwardly projecting lug 39 on the arm 33, and thereby turns the valve stem 31 in a direction to move the arm 42 to the right (looking at Fig. 1), and into contact with the opposite lug 43 on the valve. About the time this contact takes place, the movement of the pin 34 on the crank arm 33 carries the spring 35 to the opposite side of its center, and said spring immediately acts to throw the valve to its other position, in which the port 26 is open and its chamber 30 connects the ports 24 and 25. The water in the valve chamber then passes downwardly through the port 26 and upwardly through the port 28 behind the piston blade, and actuates it in the reverse direction. At the limit of its other stroke, the other arm or pin 40 comes into contact with the depending lug 39, thereby turning the valve stem 31 in the reverse direction and the spring 35 acts to throw the valve back to its former position, this automatic reversal of the valve taking place at the end of each stroke of the piston.

The motor can be attached directly to a shaft of the part to be operated. Thus, I have shown it as directly connected to a shaft 44 of a washing machine, or other device, (not shown), said shaft being inserted into the lower portion of the shaft 10 through a boss or bearing 45 on the base 6, and secured therein by the pin 38, which supports the collar 37. The casing sections may be readily taken apart by removing the fastening nuts; and by removing the pin 38 and the collar 41, access can be readily had to the stuffing box 11. The crank arm 33 is also removably secured to the valve stem 31, so that it can be quickly detached to permit access to the stuffing box 32.

The motor above described can be operated efficiently at a comparatively small consumption of water, and is capable of developing an amount of power which renders it adapted for a variety of uses. The parts are compact in their construction and arrangement, so that the motor occupies but little space, and can be readily attached to a washing machine, or other device. Access to all the working parts and their bearings is easily obtained.

What I claim is:—

1. In a motor, a motor chamber having a thrust bearing at one side and a bearing opening in the opposite side of the chamber and concentrically alined with the thrust bearing, a motor shaft having one end engaging the thrust bearing and its other end in the bearing opening, and a bearing member closing the bearing opening in engagement with the shaft and adjustable to take up wear, substantially as described.

2. In a motor, a motor chamber having a thrust bearing at one side and a bearing opening in the opposite side of the chamber and alined concentrically with the thrust bearing, a threaded cylindrical flange surrounding and projecting externally of the bearing opening, a motor shaft having one end in engagement with the thrust bearing and its other end in the bearing opening and projecting externally of the flange, and a cap having an adjustable threaded engagement with the threaded flange and engaging the projecting end of the shaft, substantially as described.

3. In an oscillating motor, a motor chamber, a motor shaft extending centrally through said chamber and through an opening in the upper wall thereof, a boss surrounding the upper end of the shaft and having a lubricant space therein, and a screw cap forming a bearing for the upper end of the shaft, said shaft having an interior lubricant chamber open at its upper end and feeding said space; substantially as described.

4. In an oscillating motor, a motor casing having an upper cylindrical portion open at the bottom, a detachable bottom plate for closing the same, a base for supporting said casing, a motor shaft extending upwardly through the central portion of said casing, a piston blade secured to said shaft within the casing, and valve mechanism actuated by the movement of the shaft to effect an oscillating movement of the blade and shaft, said shaft having means for its connection with an operating device; substantially as described.

5. An oscillating motor comprising a motor chamber, a motor shaft piercing one end of the chamber and having a radial piston working in said chamber, a bearing member carried by the chamber externally thereof across the outer end of the motor shaft and provided with a bearing opening in alinement with said shaft, the outer end of the shaft being constructed for connection with a driven shaft, substantially as described.

6. An oscillating motor comprising a motor chamber provided in opposite ends with alined bearing openings, a motor shaft projecting through both openings, a thrust bearing for one end of the shaft, and a bearing member carried externally by the motor chamber and extending across the other end of the shaft, said bearing having a shaft opening in alinement with the motor shaft, that portion of the motor shaft between the bearing member and the chamber being constructed for connection with a driven shaft received through the opening in the bearing member, substantially as described.

7. An oscillating motor comprising a motor chamber, a motor shaft projecting externally of the chamber and having a radial piston working therein, a valve controlling the supply of motive fluid, a valve stem projecting externally of the motor chamber in substantial parallelism with the projecting end of the shaft, a bearing member carried by the motor chamber across the projecting end of the shaft and provided with a shaft opening in alinement with the shaft, the outer end of the shaft being constructed for connection with a driven shaft received through the opening in the bearing, and means located between the motor chamber and the bearing plate associated with the projecting ends of the shaft and the stem for actuating the latter by the movements of the former, substantially as described.

8. In a motor of the character described, a vertical cylindrical piston chamber, a motor shaft extending centrally therethrough and having a radial piston blade, a segmental valve chamber within the motor chamber between opposite limits of the movement of the blade, circulating and exhaust ports communicating with the valve chamber through its bottom wall, an oscillating valve seated against such bottom wall and controlling said ports, said chamber having an inlet port above the valve, a valve stem on which the valve is loosely mounted and which has a tappet arm arranged to engage and actuate the valve after an initial lost motion in both directions, said stem also having an extension through the bottom wall of the valve chamber, and valve-shifting connections between the lower end of the valve stem and the motor shaft, substantially as described.

In testimony whereof, I have hereunto set my hand.

JOHN G. McDOWELL.

Witnesses:
 Geo. H. Parmelee,
 H. M. Corwin.